LAMINATES FOR PUNCH CARD SUBSTITUTES

Filed May 14, 1964

INVENTOR

Erwin G. Weber

BY Moore, Hall & Pollock

ATTORNEYS 3,405,256

LAMINATES FOR PUNCH CARD SUBSTITUTES

Erwin Gottfried Weber, Munich, Waldperlach, Germany, assignor to Sperry Rand Corporation, New York, N.Y., a corporation of Delaware Filed May 14, 1964, Ser. No. 367,508
16 Claims. (Cl. 235—61.12)

ABSTRACT OF THE DISCLOSURE

A record member wherein information contained thereon is detected by optical means and wherein the opposite major surfaces thereof may be provided with different information patterns such that the information recorded on one surface thereof differs from the information recorded on the opposite surface.

The present invention relates to record members for recording information at spaced locations thereon and is more particularly concerned with an improved such record member which may take the form of known punch cards, so arranged that the storage capacity of the member is increased over that available on known members of a given size or volume, and further so arranged that the information may be detected more efficiently, with higher signal contrast, and with less possibility of errors arising from spurious signals, than has been possible heretofore.

Various forms of punch card-type record members are known at the present time. In certain cases, the member comprises a paper material which is perforated at appropriate locations to provide information recording. A record member of this type is adapted to supply a finite amount of information dependent upon the area of the card, which information may be electrically, optically, or visually detected; and since the perforations normally extend completely through the card, the information stored on one side of the card is necessarily identical to that which would be sensed if the card were reversed and observed from its opposite side. Punch card substitutes have also been suggested wherein increased quantities of information can be stored, e.g., as individual marks or areas on one or both surfaces of the card. Information so stored may also be detected electrically or optically, or by otherwise sensing a conductivity or color contrast between the marks so made and the background material or color of the card itself. In this latter case, however, particularly where the marks so made take the form of blackened areas or the like, there is always a possibility of spurious signals if the card should become dirty, contaminated, or otherwise marred during handling thereof or processing techniques.

In an effort to obviate even this latter disadvantage, e.g., spurious signals from contaminants, it has been suggested that the marks comprise deposits of some special material, such as a luminescent material, with mark sensing then being effected by special apparatuses adapted to selectively activate and sense the special marks thus provided. Such techniques have, however, suffered from the further disadvantage that the recording of information is a relatively costly procedure requiring, as it does, the careful and accurate disposition of individual small marks or areas of luminescent material; and even with this care, errors can arise due to contaminants present in the card material itself, if the contaminants are such as to fluoresce or phosphoresce in response to attempted activation of the data marks.

The present invention, recognizing these disdavantages of record members and punch-type cards suggested heretofore, is accordingly concerned with a record member structure which utilizes a color contrast recording whereby both sides of the card can be employed for the recording of different information thereby doubling the storage capacity of the card over that available in a conventional punch card of like area; and is further such that the said contrast can be achieved by means of a fluorescent or phosphorescent pigment arranged to avoid the need of depositing individual spots or areas of such pigment, and also so arranged as to minimize the possibility of spurious signals arising from the contaminants. Indeed, as will appear, the present invention is such as to combine the advantages of both the punching and color contrast techniques suggested heretofore, while obviating the disadvantages of both.

It is accordingly an object of the present invention to provide a novel laminated medium for use in recording information.

Another object of the present invention resides in the provision of a novel record member adapted to manifest data by fluorescent, phosphorescent, or other color contrast techniques, and so arranged that both sides of the member may be employed to record information with the information on one side differing from that on the other.

A still further object of the present invention resides in the provision of a laminated record member arranged to manifest information by a luminescent emission of light, without requiring that individual spots or areas of luminescent or other special material be deposited on the member to record data on said member.

Still another object of the present invention resides in the provision of a laminated record member arranged to have data rapidly recorded thereon in such form as to offer better detection possibilities and more signal contrast than has been possible heretofore, while simultaneously minimizing the possibility of spurious signal recordings.

In providing for the foregoing objects and advantages, the present invention contemplates the provision of a laminate comprising a substantially continuous layer of luminescent material. As will become apparent, this layer preferably comprises an adhesive material having a luminescent material substantially uniformly distributed therethrough; and in its preferred embodiment, the luminescent material comprises a mixture of fluorescent and phosphorescent pigments. The continuous layer thus provided should be distinguished from fluorescent deposits suggested heretofore wherein the deposit is arranged in some special design or wherein the deposit takes the form of individual spaced marks.

The laminate, in addition to including the aforementioned pigmented adhesive layer, includes further layers of opaque material coating its opposite major surfaces whereby luminescent light emissions, or color contrast between the pigmented adhesive layer and outer card areas, is normally obscured by the cover layers. With a laminate of this type, information is stored or recorded by selectively perforating the cover layers to exposes underlying portions of the aforementioned pigmented adhesive layer whereby, upon activation of the centrally disposed adhesive layer, light is emitted, or a color contrast will become apparent, in the region of the perforations thus provided. Since the perforations are provided in the cover layer only, different patterns of perforations may be supplied in the two opposed cover layers thereby permitting one side of the card to store information differing from that on the other side thereof; and the continuous intervening pigmented adhesive layer cooperates with both these perforated cover layers to permit visual detection or optical sensing of two different sets of information, depending upon which side of the card is being viewed.

In its preferred forms, the cover layers preferably comprise metallized Mylar, with the metallized coating comprising a material such as aluminum. Back-up or strengthening layers can also be provided in the laminate, e.g., of a material selected from the group consisting of steel, epoxy glass, polyvinylchloride or plasticized film, or thicker Mylar. When the outer layers of the laminate are formed of an opaque material such as metallized Mylar, the metallic coatings preferably form the outermost surfaces of the laminate; and recording of information can then be accomplished by any appropriate electrical, electronic, manual or mechanical scraping, punching, or perforating technique serving to remove a portion of the outermost metallic or other opaque cover layer, so as to expose an underlying portion of the aforementioned pigmented layer. For example, data can be stored on the laminate of the present invention by an RF plasma-discharge recording system similar to that described in the prior copending application of John A. Engstrom and Erwin G. Weber, Ser. No. 316,979, filed Oct. 16, 1963, for "Signal Responsive Apparatus," and assigned to the assignee of the instant application. Using such a recording system, the laminated record member of the present invention may be disposed between a pair of electrodes and subjected, at a desired data recording location, to a pulsed field of between 4 mc. and 10.5 mc., having a duration of between 50 and 60 micro-seconds, and adapted to effect a RF discharge which progresses beyond the corona stage, but which is extinguished when it reaches the brush transition area prior to its forming an arc between the electrodes. Such a discharge can operate to remove a portion of the outermost metallic or other opaque coating thereby revealing the underlying portion of the aforementioned pigmented adhesive.

With the laminates of the present invention, therefore, data may, in effect, be recorded on either or on both sides of the laminate by a technique analogus to the "punching" technique suggested heretofore, with the recorded data then manifesting itselt as a color contrasting luminescent emission. Moreover, the resulting record, while permanent in nature, may if desired be readily erased simply by masking or covering apertures previously formed, a technique to which conventional punch cards do not lend themselves.

The foregoing objects, advantages, construction and operation of the present invention will become more readily apparent from the following description and accompanying drawings, in which.

Figure 1:
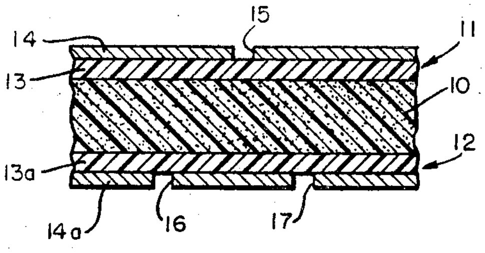
FIGURE 1 is an enlarged cross-sectional view illustrating a portion of one form of laminate constructed in accordance with the present invention.

Referring initially to FIGURE 1, it will be seen that a laminate constructed, and capable of being employed, in accordance with the structure and technique described previously may comprise a substantially centrally located layer 10 fabricated of an appropriately pigmented adhesive and coated on its opposed major surfaces with normally opaque cover layers 11 and 12. In the particular form shown in FIGURE 1, each of the opaque cover layers 11, 12 comprises metallized Mylar constituting layers 13, 13*a* of Mylar sheet material metallized to exhibit outermost metallic surfaces (e.g., of aluminum) 14, 14*a*.

Adhesive layer 10 in each of the several embodiments of the present invention comprises an adhesive matrix material which is pigmented by an appropriate luminescent material substantially uniformly distributed therethrough. In one form of the present invention, the layer 10 may take the following composition:

100 parts by weight of Du Pont 46950 adhesive (a polyester adhesive).
17 parts by weight of fluorescent pigment marketed by Rhode Island Laboratories, Inc., West Warwick, R.I., under the designation Violite ZF–1650.
3 parts by weight of a phosphorescent pigment marketed by United States Radium Corporation, Morristown, N.J., under the designation Helecon 2315 (a zinc sulfide-cadmium-sulfide compound).

Variations may be made in this composition, e.g., the polyester adhesive Du Pont 46950 may be replaced by Du Pont 4684 adhesive material (a modified synthetic rubber adhesive), with fluorescent and phosphorescent pigments being dispersed therethrough; and in either case, the adhesive material selected has been found not to quench the fluorescence or phosphorescence of the pigments. The pigments in either case preferably consist of 85% fluorescent and 15% phosphorescent material by weight; and the pigments are easily mixed into the adhesive matrix material with a spatula or otherwise, and require no special dispersing technique. It sould be noted that the fluorescent pigments can be ground with conventional grinding equipment to achieve greatest uniformity of distribution. Since the phosphorescent properties of the phosphorescent pigments depend upon their crystalline structure, however, they should not be ground in paint mills or other grinding equipment that would damage the crystalline structure.

The outermost metallic layers 14–14*a* of the normally opaque cover layers 13–14 and 13*a*–14*a* may be perforated at appropriate locations, e.g., by an RF plasma-recording technique such as has been described previously. A typical such perforation is shown at 15 in metallic layer 14, with different perforations 16 and 17 being provided in the metallic layer 14*a*. After the several apertures or holes 15, 16, 17 have been burned through, or otherwise made in, the metallized layers 14 and/or 14*a*, the laminate can be exposed to ultra-violet light in which event the pigmented adhesive layer 10 phosphoresces and fluoresces to emit light and/or manifest a color contrast through the removed areas 15–16–17. With the particular pigments described previously, the color contrast takes the form of a brilliant green color easily discernible with the eye and markedly contrasting with the unperforated areas of the metallized coatings 14–14*a*.

It should be noted, of course, that the laminated structure shown in FIGURE 1 (as well as in the other figures) has been exaggerated in size to best illustrate their make-up. In practice, the pigmented adhesive layer 10 may have a thickness in the order of 0.001 inch; and each of the metallized layers 13–14 and 13*a*–14*a* may have a thickness in the order of 0.0005 inch, whereby the overall thickness of the laminate actually illustrated in FIGURE 1 may be only 0.003 inch. A laminate of this extreme thickness is nevertheless very strong due to the materials selected; and if it is desired to impart further rigidity to the laminate, appropriate strengthening materials can be added.

Figure 2:
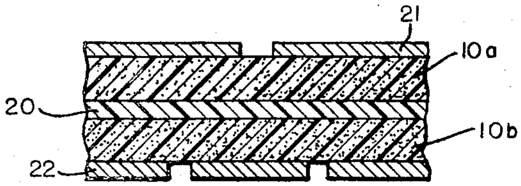
FIGURE 2 is an enlarged cross-sectional view showing a portion of an alternative form of laminate constructed in accordance with the present invention.

This alternative consideration is best shown in FIGURE 2, wherein the pigmented adhesive inner layer is depicted at 10*a*–10*b* and is shown, moreover, to incorporate an inner rigidifying and strengthening layer 20. The layer 20 may comprise steel sheet material having a thickness of 0.004 inch to 0.010 inch; may comprise epoxy glass having a thickness, for example, of 0.008 inch; may comprise polyvinylchloride unplasticized film having a thickness of substantially 0.0075 inch; may comprise Mylar having a thickness of substantially 0.010 inch; or may comprise any other appropriate strengthening material known to those skilled in the art. It should be noted, moreover, that the particular dimensions suggested above for the rigidifying layer 20 are subject to variation, as are the other thickness dimensions of the other layers in the overall laminated record member, depending upon the desired environments in which the record member will be employed, the rigidity or flexibility which the member must evidence in those environments, et cetera. The laminated structure of FIGURE 2 again includes outermost opaque layers 21 and 22 colored to contrast with the color of inner layers 10*a*–10*b*; and said layers 21 and 22 may again comprise metallized Mylar, or may, in the alternative, comprise some other appropriate opaque material such as metal foil alone. In any event, the outermost opaque layers 21–22 are perforated selectively, in accordance with the electronic, manual, or mechanical techniques mentioned previously, thereby to provide information on both sides of the laminate, which information may, if desired, differ from one side to the other.

Figure 3:
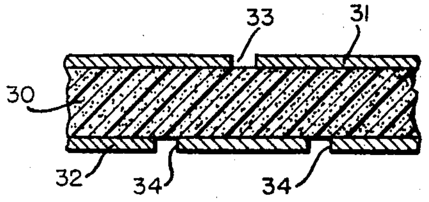
FIGURE 3 is an enlarged cross-sectional view of a portion of still another laminate constructed in accordance with the present invention.

As described in reference to FIGURE 2, the outermost opaque layer can take forms other than metallized Mylar, so long as the actual materials employed for the outer cover layers are normally opaque (as well as normally conductive, if one or both of the outermost layers are to be used as an electrode during recording and/or reproducing information); and so long as said cover layers are of a color which contrasts with the inner layer, thereby to permit optical discrimination between the outermost layer and the underlying material. It is immaterial which of the layers is the more highly colored, so long as a high degree of color contrast is maintained. These general considerations are shown in FIGURE 3, wherein the inner pigmented adhesive layer is shown as coated, on its opposed surfaces by opaque layers 31 and 32 perforated at 33 and 34, respectively. The layers 31 and 32 may, as was mentioned in reference to FIGURE 2, comprise metal foil material; or, in the alternative, may comprise materials such as carbon or zinc oxide which, if originally in powder form, should be used with an appropriate binder or the like for securing the opaque cover layers to the underlying surfaces of the laminate.

The recording of information on any of the laminates described above can be effected mechanically or manually by the physical removal of a portion of the outermost cover layer or layers. Such recording can also be effected electrically by using an RF plasma discharge to vaporize a small area on the outermost metallic or conductive coating of the laminate, thereby forming a discrete storage indication in the form of a "window" or aperture at a particular location on the card. Such an electrical or electronic recording technique is illustrated diagrammatically in FIGURE 4.

Figure 4:
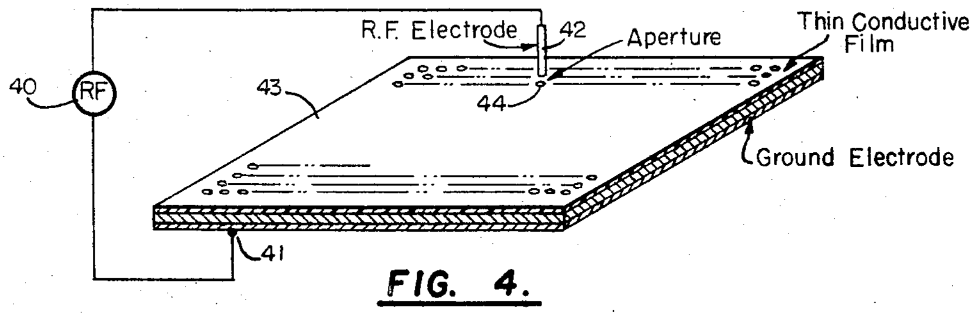
FIGURE 4 is a diagrammatic view of a data recording system utilizing the laminates of the present invention.

As is shown in FIGURE 4, an RF source 40 may be provided, one side of which is coupled, as at 41, to a ground electrode, and the other side of which is coupled to a movable RF electrode 42 taking the form of a finely-pointed probe. The probe or electrode 42 may be moved relative to the conductive outermost surface or cover layer of the laminate, generically designated as 43, whereby, upon energization or activation of source 40, an aperture such as 44 may be produced in said outermost layer of the laminate without disturbing the underlying laminations.

When the overall laminate 43 is of the type shown in FIGURE 2, the ground electrode, to which side 41 is coupled, may be layer 20, it being appreciated that, in this case, layer 20 should be a conductive material such as the steel sheet material described previously. In the event that a laminate of the type shown in FIGURE 1 is utilized, the side 41 of RF source 40 can be coupled to metallic surface 14*a*, with the probe then being variously moved relative to surface 14, whereafter the connections may be reversed to effect recording on the other side of the laminate. Similar considerations apply when the laminate of FIGURE 3 is employed, i.e., the side 41 and probe 42 of RF source 40 may be coupled to layers 31 and 32, respectively, and then reversed.

With the laminate of FIGURE 2, the rigidifying layer 20 can readily have sufficiently large dimensions and current carrying capacity to permit its use as a ground electrode. In the case of the laminations shown in FIGURES 1 and 3, however, it is possible that the outermost metallic layers may be so thin that they do not normally have current carrying capacities sufficient to permit their use, alone, as a ground electrode; and, in such case, the current capacity of the layer acting as a ground electrode can be augmented by bucking up that particular layer against a thicker sheet of metal during the recording operation, whereby the thicker sheet of metal, together with the adjacent metal film of the laminate act together as the ground layer.

It should further be noted that, while the laminates and techniques of the present invention form permanent records of information, the type of structure employed permits ready "erasure" of the information by a revaporization or evaporation technique, e.g., if data on a particular card is no longer needed, the card can be restored to its original form by passing the laminate through a metallic vapor zone operative to deposit metal on the outermost surfaces of the laminate to cover apertures previously formed therein, thereby readying the card for re-perforating or recording of new information thereon. Thus, while the cards of the present invention exhibit the advantages of both punch cards and luminescent data cards suggested heretofore, while avoiding the disadvantages of each, all as described previously, the present invention has the still further advantage of permitting erasure of information, something not readily accomplished with the prior card structures.

While I have thus described preferred embodiments of the present invention, many variations will be suggested to those skilled in the art. It must, therefore, be understood that the foregoing description is intended to be illustrative only, and should not be considered limitative of my invention; and all such variations and modifications as are in accord with the principles described are meant to fall within the scope of the appended claims.

Having thus described my invention, I claim:

1. A laminated record member comprising at least one substantially continuous layer of luminescent material, said luminescent layer defining opposed substantially flat major surfaces extending in generally parallel relation to one another, and a pair of substantially continuous cover layers of opaque material covering said opposed major surfaces, each of said cover layers defining apertures therethrough disposed in a recorded information pattern, said apertures enabling said luminescent material to emit light when activated to distinguish said apertures from said cover layers, the aperture pattern defined by one of said cover layers differing from the aperture pattern defined by the other of said cover layers whereby the recorded information defined by one of said cover layers differs from the recorded information defined by the other of said cover layers.

2. The structure of claim 1 wherein said luminescent layer comprises an adhesive material having a luminescent pigment substantially uniformly distributed therethrough.

3. The record member of claim 2 including at least one further substantially continuous layer of a strengthening material disposed in engagement with said luminescent adhesive layer between said cover layers and extending generally parallel to said cover layers.

4. The record member of claim 2 wherein said luminescent pigment comprises a mixture of fluorescent and phosphorescent pigments.

5. The record member of claim 4 wherein said mixture comprises substantially 85% fluorescent pigment and substantially 15% phosphorescent pigment by weight.

6. The record member of claim 1 wherein said opaque cover layers comprise metallic films.

7. A laminated record member comprising a first layer of a fluorescent and phosphorescent pigmented adhesive said first layer defining a pair of opposed major surfaces, second and third opaque layers covering said major surfaces respectively, each of said second and third layers comprising a metallized plastic film, and a plurality of data-representing apertures in said second and third layers for emitting light from said first layer through both said second and third opaque layers upon excitation of said pigmented adhesive first layer, said light distinguishing said apertures from said opaque layers.

8. The record member of claim 7 wherein the data-representing apertures in said second and third layers are disposed in differently patterned configurations respectively.

9. The record member of claim 7 wherein said first layer is thicker than either of said second and third layers.

10. A laminated record member comprising a flat continuous interior layer of material having a first color, a pair of external cover layers fabricated of materials contrasting in color with said first color, said cover layers being positioned over substantially the entire opposing major surfaces of said flat interior layer thereby normally to conceal the first color of said interior layer, and apertured portions in each of said cover layers for producing patterns of said first color from said interior layer visible through the apertured portions of said cover layers and contrasting in color with said cover layers in accordance with desired data representations, said apertured portions being so positioned that the pattern of said first color visible through one of said cover layers differs from the pattern of said first color visible through the other of said cover layers thereby to produce data representations which differ in dependence upon which surface of said laminated record member is being viewed.

11. The structure of claim 10 wherein said cover layers comprise a translucent plastic material having an opaque metallic coating thereon, said apertured portions comprising gaps in said metallic coating, the portions of said plastic material underlying said gaps being uninterrupted.

12. The structure of claim 11 wherein said interior layer comprises a selectively energizable material adapted to emit light of said first color upon energization, said light distinguishing said apertures from said cover layers.

13. A record member of the punch card type comprising a substantially continuous first layer of pigmented adhesive, second and third layers of Mylar covering the opposed major surfaces of said first layer, each of said second and third layers having an outermost metallic film coating thereon, portions of both said metallic film coatings being interrupted at spaced locations to form data-representing patterns thereon exposing underlying portions of said continuous first layer through said Mylar layers, the data-representing patterns of said two metallic film coatings differing from one another.

14. The structure of claim 13 wherein said adhesive layer has a fluorescent pigment dispersed therethrough.

15. The structure of claim 13 wherein said adhesive layer has a phosphorescent pigment dispersed therethrough.

16. A laminated record member comprising a flat continuous interior layer of luminescent pigmented material adapted, upon activation, to emit light of a first color, and a pair of external opaque cover layers at least one of which contrasts in color with said first color, said cover layers being positioned over substantially the entire opposing major surfaces of said flat interior layer thereby normally to conceal the first color of said interior layer, said color contrasting cover layer being adapted to have apertures selectively formed therein for producing data representing manifestations of said first color from said interior layer visible through said apertures and contrasting in color with the color of said contrasting cover layer.

References Cited

UNITED STATES PATENTS 2,251,742 8/1941 Kline.
2,664,044 12/1953 Dalton.

DARYL W. COOK, *Primary Examiner.*